United States Patent
Fang et al.

(10) Patent No.: US 9,747,354 B2
(45) Date of Patent: Aug. 29, 2017

(54) SYSTEMS AND METHODS FOR PUBLISHING DATA THROUGH SOCIAL MEDIA WEBSITES

(71) Applicants: Kuo-Chun Fang, Inglewood, CA (US); Grace Fang, Inglewood, CA (US)

(72) Inventors: Kuo-Chun Fang, Inglewood, CA (US); Grace Fang, Inglewood, CA (US)

(*) Notice: Subject to any disclaimer, the term of this patent is extended or adjusted under 35 U.S.C. 154(b) by 299 days.

(21) Appl. No.: 14/748,533

(22) Filed: Jun. 24, 2015

(65) Prior Publication Data

US 2016/0210022 A1  Jul. 21, 2016

Related U.S. Application Data

(63) Continuation-in-part of application No. 14/721,001, filed on May 26, 2015.

(60) Provisional application No. 62/105,314, filed on Jan. 20, 2015, provisional application No. 62/111,223, filed on Feb. 3, 2015.

(51) Int. Cl.
*G06F 17/30* (2006.01)

(52) U.S. Cl.
CPC ................................ *G06F 17/3056* (2013.01)

(58) Field of Classification Search
None
See application file for complete search history.

(56) References Cited

U.S. PATENT DOCUMENTS

| 9,336,276 B2 * | 5/2016 | Wilder | G06F 17/30525 |
| 2008/0195664 A1 * | 8/2008 | Maharajh | G06F 17/30035 |
| 2013/0046773 A1 * | 2/2013 | Kannan | G11B 27/105 |
| | | | 707/754 |

* cited by examiner

*Primary Examiner* — Kenny Lin

(57) ABSTRACT

Systems and methods and for publishing data on social media website(s) are disclosed. A system may include an identifier processing device for determining a device identifier (ID) of a computing device publishing a social media website. The device ID uniquely identifies the computing device in a network. The identifier processing device may be configured to extract data from the determined device identifier. The system may also include a tagging device for determining a unique identifier based on the extracted data. An identifier processing device of the system is configured to present a menu including options for customizing the unique identifier, customize the unique identifier based on a selection of option received from the user, and associate the customized unique identifier with user-generated data. A data publishing device of the system may publish the customized unique identifier along with the user-generated data through the social media website on the computing device.

13 Claims, 5 Drawing Sheets

SYSTEMS AND METHODS FOR PUBLISHING DATA THROUGH SOCIAL MEDIA WEBSITES

CROSS REFERENCE OF RELATED APPLICATION

This application is a continuation in part ("CIP") patent application and claims the priority date(s) of U.S. patent application Ser. No. 14/721,001 filed on or about May 26, 2015. The '001 application is a non-provisional application claiming the priority date of U.S. provisional patent application 62/105,314 filed on or about Jan. 20, 2015 and U.S. provisional patent application 62/111,223 filed on or about Feb. 3, 2015. The present application claims the priority dates of the patent applications listed above and those listed in the concurrently filed Application Disclosure Statement or ADS.

FIELD OF THE INVENTION

The present invention generally relates to techniques for publishing data in a network through various social media websites. Particularly, the present subject matter relates to systems and methods for tagging data, such as images, social media postings, etc., with unique identifier(s), and customizing the unique identifier or tags before publishing the data along with the unique identifier(s) on various social media websites in a network.

BACKGROUND OF THE INVENTION

With an ever-increasing data and information on the Internet, finding relevant information has become a daunting task. To add to this, the enthusiasm of people to capture every moment of their lives and upload the same on social media networks has made this web of information even more tangled and complex. Constant updating of status, images, locations, activities etc. provides the millions of social media users an opportunity to showcase the social and other aspect of their lives. Amidst this social networking frenzy, a trend that has caught the fancy of users is that of tagging their pictures, data, location and other information to ensure that their data becomes a part of a specific theme based pool of information that can be easily showcased or retrieved at a later time by using the specific tags. One such common tagging mechanism is adding 'Hashtags' to any data uploaded on social media.

A hashtag may be a metadata tag or label added to any data posted on social media networks to ensure that users searching for information related to a specific theme or field easily find the data. For example, the hashtag "#YummyItalian" added to a picture of friends at an Italian restaurant showcases visit to an Italian restaurant and the friends' view that the food at the restaurant is great! All that a user needs in order to promptly upload data on social media platforms is a user device such as a smart phone, tablet etc. and a wireless access device such as a wireless router that enables the user device to wirelessly connect to the Internet. Widespread usage of wireless access devices at public and commercial places has become a boon for social networking users to constantly post and tag data on social networking platforms.

Though a great way to sort and access data posted on social media, hashtags and other tagging mechanisms have also resulted in a lot of wrong and redundant categorization of social media data. This is because either user do not know the correct manner of tagging social media data posted by them or lot of non-uniform and random tags are used. For example, for photographs of two different groups of friends dining at the same restaurant, one photograph is tagged "#YummyItalian" while the other is tagged "#AwesomeFood". Now a user looking for good Italian food online will be able to access the first photograph but not the second due to usage of an overly generic tag. Moreover, in both the instances, the restaurant owner does not benefit in any way as the restaurant is not identified in any of the tags and the owner has to rely on the users' discretion of disclosing the location of dining or the name of the restaurant.

SUMMARY

In today's world where sorting the pool of information and data available on social media has become essential for enabling meaningful access and utilization of such data, techniques are needed that helps the users to appropriately tag the social media data being uploaded. Also, there is a great need of a method that helps the businesses take advantage of this tagging done by social network users.

The present disclosure provides systems and methods for improved techniques for publishing data through various social media websites by using a computing device. The present disclosure also provides methods and systems for tagging data with unique identifiers and publishing the data and the associated unique identifiers or tags through social media website by using the computing device, which overcomes the above-referenced limitations and others. The present disclosure also provides methods and systems allowing the user to customize unique identifier or tags before publishing the data on the social media websites.

The present disclosure finds particular application in publishing data through various websites, such as social media websites, based on device identifiers of the computing devices in a network, and will be described with particular reference thereto. However, it is to be appreciated that the present disclosure is also amenable to other like applications.

The present invention is directed to methods, systems and computer program products for publishing data on social media websites using a first computing device, wherein the data posted on a social media website is attached with a unique data derived from a device identifier broadcasted by a second computing device.

In one implementation, methods, systems, and computer program products are provided for posting or publishing data on a social media website using a computing device such as, a first computing device. The method provides detecting a second computing device having an associated device identifier. The second computing device broadcasts these device identifiers to computing device(s) in the vicinity. Data may be extracted from the broadcasted device identifiers and is then attached to a user-generated data. Thereafter, the device identifier and the user-generated data is posted or published on social media website(s).

In one implementation, a computer program product including program instructions tangibly stored on a computer-readable medium and operable to cause a computer system to perform a method is provided. The computer program product stores the instruction for capturing the device identificer, by a first computing device, broadcasted by a second computing device. The CPP also includes instructions for extracting data from the device identifier and attach the extracted data to a user-generated data before posting it on social media.

In other implementations, the computing device used can be any device which can perform calculations and can be used for generating and/or uploading user generating data for posting on social media. The computing device without any limitation includes devices like phones, tablets, computers, mobile devices, and laptops. In other implementations, the extracted data of the device identifier can either be in the form of formatted text, unformatted text or can include alphabets, numbers, symbols, and so forth. In one implementation, the device identifier includes a service set identifier. In one implementation, the wireless access device is a router. In other implementations, methods, systems and computer program products are also provided to allow users to select the extracted data or device identifiers as tags while posting to social media websites or to automatically attach tags while posting to social media websites. Also, methods, systems and computer program products are provided to add or attach geographical or time relevant information in form of tags to the user-generated data while posting the data on the social media website(s).

An embodiment of the present disclosure provides a system for publishing data on at least one social media website. The system may include an identifier processing device configured to determine a device identifier (ID) of a computing device publishing the at least one social media website. The device identifier may uniquely identify the computing device in a network. The identifier processing device may also be configured to extract data from the determined device identifier of the computing device. The system may also include a tagging device configured to determine at least one unique identifier or tag based on the extracted data of the device identifier. The system also includes an identifier customizing device for presenting a menu to a user. The menu may include one or more options for allowing the user to customize the unique identifier. The identifier customizing device may be configured to customize the unique identifier based on a selection of at least one option received from the user. The identifier processing device may also be configured to associate the customized unique identifier with a user-generated data. The system may also include a data publishing device configured to publish the unique identifier along with the user-generated data through the at least one social media website on the computing device.

Another embodiment of the present disclosure provides a method for publishing data on at least one social media website. The method may include determining, by an identifier processing device, a device identifier (ID) of a computing device publishing the at least one social media website. The device identifier may uniquely identify the computing device in a network. The method may also include extracting, by the identifier processing device, data from the determined device identifier of the computing device. In some embodiments, the device identifier is of a second computing device and is captured by the identifier processing device of a first computing device. The method may also include determining, by a tagging device, at least one unique identifier based on the extracted data. The method may further include presenting, by an identifier customizing device, a menu to a user. The menu may include one or more options for customizing the at least one unique identifier. The method also includes customizing, by the identifier customizing device, the at least one unique identifier based on a selection of at least one of the options received from the user. The method also includes associating, by the identifier customizing device, the customized at least one unique identifier with a user-generated data. The method may also include publishing, by a data publishing device, the customized at least one unique identifier along with the user-generated data through the at least one social media web site.

Yet another embodiment of the present disclosure provides a method for publishing data through at least one social media website using a first computing device. The method may include detecting, by a detection device, a second computing device present within a pre-defined area from the first computing device. The method may also include capturing, by an identifier processing device, a device identifier of the second computing device during broadcast of the device identifier by the second computing device. The device identifier may uniquely identify the second computing device in a network. The method may also include determining, by a tagging device, at least one unique identifier base don the captured device identifier. The method also includes presenting, by an identifier customizing device, a menu including one or more options for customizing the at least one unique identifier to a user. The method further includes, customizing, by the identifier customizing device, the at least one unique identifier based on a selection of at least one of options by the user. The method further more includes associating, by the identifier customizing device, the customized at least one unique identifier with a user-generated data. The method further includes publishing, by a data publishing device, the user-generated data along with the customized unique identifier through the at least one social media website.

A further embodiment of the present disclosure provides a system for publishing data on at least one social media website using a first computing device. The system may include a detection device configured to detect a second computing device present within a pre-defined area from the first computing device. The system may also include an identifier processing device configured to capture a device identifier of the second computing device during broadcast of the device identifier by the second computing device. The device identifier may uniquely identify the second computing device in a network. The system may also include a tagging device configured to determine at least one unique identifier based on the extracted data of the device identifier. The system further includes an identifier customizing device configured to present a menu to a user. The menu may include one or more options for customizing the at least one unique identifier. The identifier customizing device is also configured to customize the at least one unique identifier based on a selection of at least one of the options received from the user. The identifier customizing device is also configured to associate the customized at least one unique identifier (or tag) with the user-generated data. The system may also include a data publishing device configured to post the user-generated data along with the customized at least one unique identifier through the at least one social media website on the computing device such as the first computing device.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
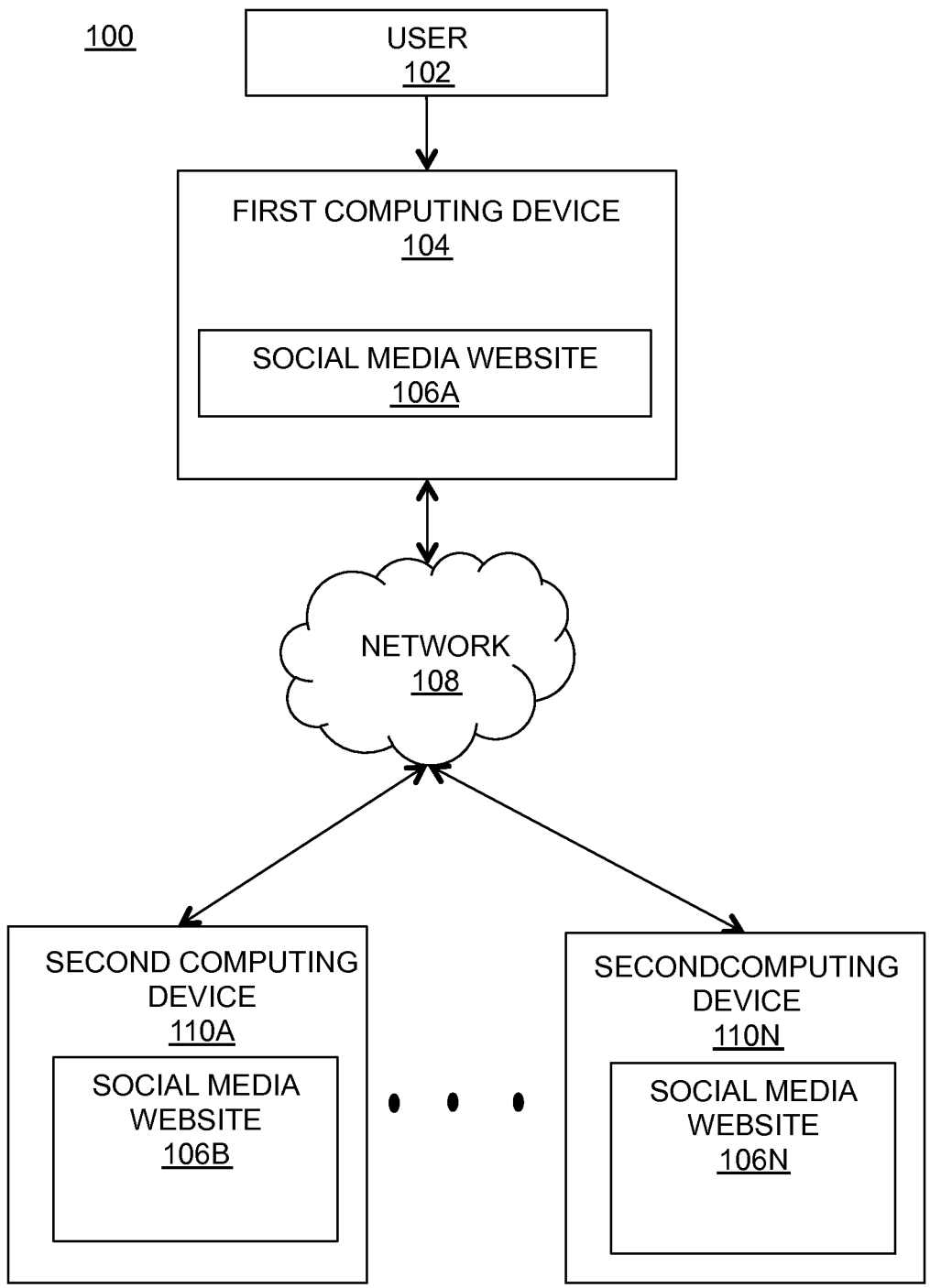
FIG. 1 is a schematic diagram illustrating an exemplary environment, where various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Non-Limiting Definitions:

In various embodiments of the present disclosure, definitions of one or more terms that will be used in the document are provided below.

As used herein, a "computing device" as used herein includes a single device capable of communicating, and exchanging one or messages with other devices present in a network. The computing device is also configured to connect to the network such as the Internet.

As used herein, a "Graphical User Interface" (GUI) can include an interface on the device enabling a user to interact with the device or computing device.

As used herein, a "social media website" refers websites that may allow people to create, share or exchange information, ideas, and pictures/videos in a virtual community or virtual social network.

As used herein, a "computing device" can include a single device or multiple devices, which may be configured to automatically tag data or data of various images and the data/data posted on various social media websites, and combination of any of these.

As used herein, an "identifier processing device" refers to a device including a software, hardware or combination of these, that is configured to process device identifier captured from computing devices.

Further, as used herein, a "tagging device" refers to a device including hardware, software, firmware, or combination of these, that can be configured to tag the extracted data with a user-generated data in the network.

Further, as used herein, a "data publishing device" refers to a device including hardware, software, firmware, or combination of these. Further, the data publishing device can publish data on various social media websites in the network.

Further, as used herein, a "transceiving device" is a device configured to transmit or receive data, files, and images to and from computing device in the network. The transceiving device can include hardware, software, firmware, and combination of these.

The device or system for publishing data on social media websites may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

EXEMPLARY EMBODIMENTS

FIG. 1 is a schematic diagram illustrating an exemplary environment 100, where various embodiments of the present disclosure may function. The environment 100 may primarily include a first computing device 104, a number of second computing devices 110A-110N interconnected to each other via a network 108. Each of the first computing device 104 and the second computing devices 110A-110N may be accessed by a user, for example, the first computing device 104 may be accessed by a user 102. Examples of the first computing device 104, and the second computing devices 110A-110N may include, but are not limited to, laptop computers, desktop computers, smart phones, tablet computers, mobile phones, televisions, and so forth. Further, the first computing device 104 and the second computing devices 110A-110N may exchange data or information with each other via the network 108. Further, the network 108 can be a wired network, a wireless network, and combination of these. In some embodiments, the first computing device 104 and the second computing devices can communicate with each other via wireless communication such as Near Field Communication (NFC), Bluetooth®, and Wi-Fi communication, and so forth.

Further, the first computing device 104 may be configured to publish data on a social media website 106A. The user (such as the user 102) can access at least one of a social media websites 106A-106N on their computing devices, for example, at the first computing device 104, the second computing devices 110A-110N, and so forth. In some embodiments, the user 102 may be required to enter login credentials such as login identifier, password etc. at the first computing device 104 for accessing the social media websites 106A-106N.

Further, the user 102 may post or upload data through the social media website 106A by accessing the network 108 (or the Internet™). Hereinafter, for the sake of better understanding the posted data or uploaded data on the social media website may be referred as a posting or data posting. In some embodiments, the postings on a number of social media websites 106A-106N can include an image, a discussion form, a textual data, a Quick Response (QR) code or the like.

In some embodiments, the first computing device 104 may be configured to detect one or more of the second computing devices 110A-110N that are present in vicinity or present within a pre-defined area for example, within 5 meters, from the first computing device of the first computing device 104. Each of the second computing devices 110A-110N has an associated device identifier. The device identifier may uniquely identify the second computing devices 110A-110N in the network 108. Examples of the device identifier may include, a Service Set Identifier (SSID), a Universal Unique Identifier (UUID), and so forth. Each of the second computing devices 110A-110N is configured to broadcast their associated device identifier in the network 108.

The first computing device 104 may be configured to capture one of the device identifiers from the broadcasted identifiers of one or more second computing devices 110A-110N. The first computing device 104 is configured to extract data from the captured device identifier. Further, the first computing device 104 may be configured to extract data from the device identifier, by applying one or more pre-defined rules. Examples of the predefined rules may include, but are not limited to, rules for recognizing and extracting social media handlers. Examples of the handlers may include, but are not limited to, "#Hashtag", "@MyHandle", "Owner@email.com", "http://domain.com/sub", "Quick Response (QR) code", and so forth. In some embodiments, the user 102 while configuring the first computing device 104 may specify the predefined rules. In some embodiments, the first computing device 104 extracts data from the device identifier by ignoring space in between the text or spelling errors on the device identifiers, postings etc..

The first computing device 104 is also configured to determine a unique identifier or tag based on the extracted data. The first computing device 104 is also configured to present a menu such as an identifier customization menu including one or more options to the user 102. In some embodiments, the menu is presented on a display associated with the first computing device 104. In some embodiments, the menu may include options for tags, for example for a tag #YummyFood the options may be #YummyFood, @YummyFood, !YUMMYFOOD, or canned text such as #TASTYFOOD, #YUMYUMFOOD, #GREATFOOD, and so forth.

The first computing device 104 is also configured to format the extracted data for determining the one or more unique identifiers based on the extracted data. The first computing device 104 may be configured to associate the extracted data with a user-generated data. The first computing device 104 may also be configured to publish or post the user-generated data along with the unique identifiers through one of the social media websites 106A-106N.

The first computing device 104 may be configured to publish the user-generated data, such as posting, along with the customized unique identifiers through at least one of the social media websites 106A-106N that are being accessed on the second computing devices 110A-110N and the first computing device 104 based on a publishing setting defined by the user 102. For example, the user 102 may define or select one or more of the social media websites 106A-106N on which the data and the identifier can be published.

In some embodiments, the first computing device 104 may send the device identifier to a network device or another computing device in the network 108 for processing. The network device or another computing device such as a server device, may process the device identifier and publish the data on the network 108 through the social media websites 106A-106N.

Further, the extracted data, identifiers, login credentials may be stored at the first computing device 104 or at another device such as the server device within the network 108.

The server device may be configured to receive the device identifier of the first computing device 104. In some embodiments, the server device may detect the device identifier of the first computing device 104 using wired or wireless communication. The first computing device 104 can connect to the server device via the network 108. The server device is also configured to extract data from the device identifier and/or format the device identifier. The server device may be configured to determine one or more unique identifiers or tag based on the extracted data.

The server device may also be configured to display a menu such as an identifier customization menu including options that allow the user 102 to customize or choose the unique identifiers. The options may include "#identifier", "@identifier", and so forth. The options may include canned-text. The server device may also be configured to associate the customized unique identifiers with user-generated data including such as, but not limited to, images, text, postings, and so forth. The server device is also configured to send the user-generated data along with the customized unique identifiers to the first computing device 104. The first computing device 104 may then publish the user-generated data along with the unique identifiers through one or more social media websites 106A-106B based on a user defined settings.

In some embodiments, the server device may publish the user-generated data along with the customized unique identifiers through one or more social media websites 106A-106B based on a user defined settings. Further, in some embodiments, the first computing device 104 may broadcast the unique identifiers and the broadcasted information may be detected by the second computing devices 110A-110N, and vice versa. Each published posting of the social media websites 106A-106N may include a hash symbol i.e. "#", an "@" symbol, and a canned text. The canned text may be a drop down list including the probable unique identifiers based on the extracted data or user-generated data. Further, the first computing device 104 allows the user 102 to select or customize different unique identifiers for different social media websites 106A-106N. This way the disclosed system on the first computing device 104 may streamline the operation of tagging the content on various social media websites with unique identifiers and eliminates mis-firing that may happen sure to typing errors, and omissions.

Figure 2:
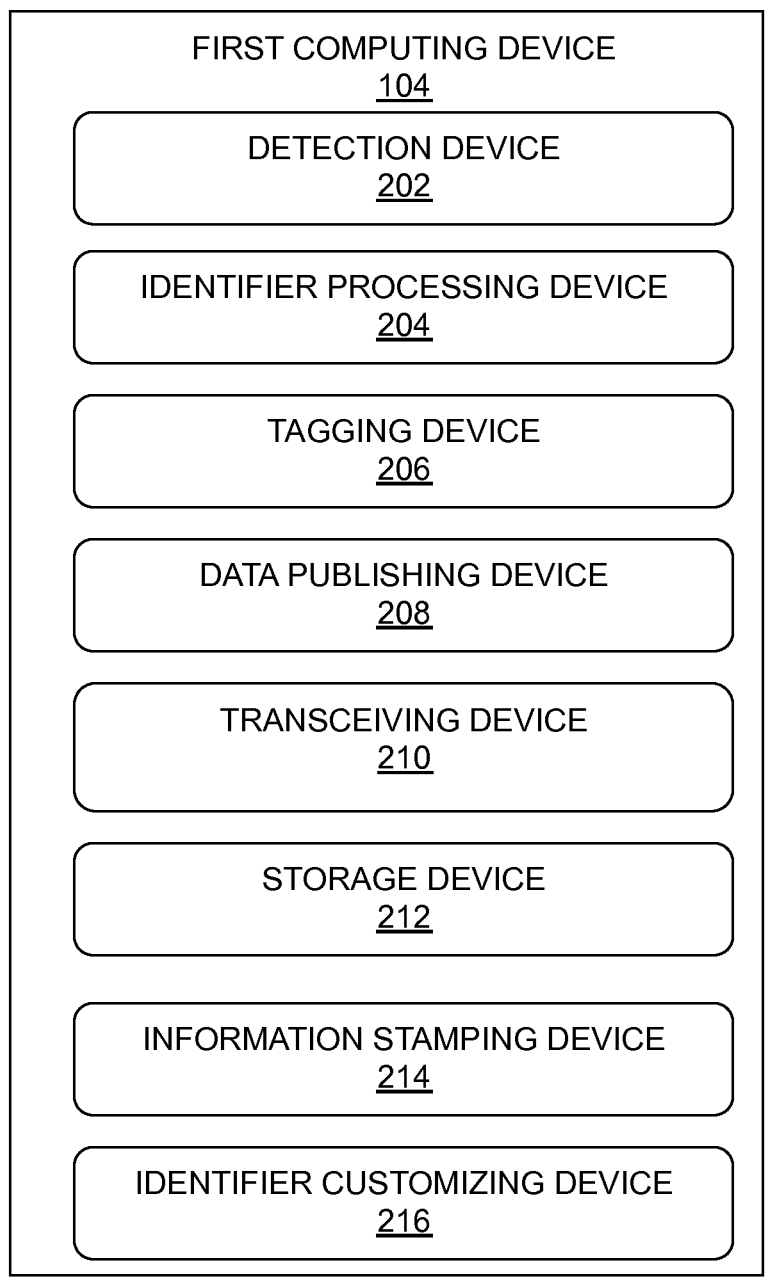
FIG. 2 is a block diagram illustrating various system elements of an exemplary computing device, in accordance with an embodiment of the present disclosure.

FIG. 2 is a block diagram 200 illustrating various system elements of the exemplary first computing device 104 if FIGS. 1A-1B, in accordance with an embodiment of the present disclosure. As shown, the first computing device 104 primarily may include a detection device 202, an identifier processing device 204, a tagging device 206, a data publishing device 208, a transceiving device 210, a storage device 212, an information stamping device 214, and an identifier customizing device 216.

As discussed with reference to FIG. 1A-1B, the first computing device 104 may be accessed by the user 102 for publishing data or content through the social media websites 106A-106N. The detection device 202 may be configured to detect other computing devices such as the second computing devices 110A-110N, present within a pre-defined distance from the first computing device 104. The identifier processing device 204 is configured to capture device identifier(s) of the second computing devices 110A-110N broadcasting the device identifiers.

The identifier processing device 204 is also configured to extract a device identifier of one or more of the second computing devices 104-104N. In some embodiments, the identifier processing device 204 extracts a device identifier of the first computing device 104. The identifier processing device 204 may extract the data such as, numbers, alphabets, pictures, text, symbols, etc. from the images based on the predefined rules. The identifier processing device 204 may also be configured to apply the predefined rules for extracting the data from the device identifiers by using the OCR technique. In some embodiments, the identifier processing device 204 for extracting the data from the device identifiers uses an Optical Pattern Recognition (OPR) technique. Examples of the predefined rules for extracting text from the device identifiers may include, such as, but not limited to, a rule to extract the text with no space included in between words, a rule to extract the text that is highlighted in the image, a rule to extract the text that is not preceded with a hash tag, a rule to extract the text that is preceded with a hash tag, with no spaces included between the words, and without checking the spelling, and so forth. Further examples of the predefined rules may include, such as, but not limited to, one or more predefined rules for recognizing and extracting five types of social media handlers. The five types of social media handlers may include "#Hashtag", "@MyHandle", "Owner@email.com", "http://domain.com/sub", "Quick Response (QR) code", and so forth. Further, the identifier processing device 204 may be configured to use an Optical Character Recognition (OCR) or OPR technique for extracting the data from the images. The identifier processing device 204 may also be configured to format the extracted data. The identifier processing device 204 may be further configured to format the extracted data by using the special notations.

The tagging device 206 is configured to determine at least one unique identifier based on the extracted data of the device identifier. In some embodiments, the tagging device 206 determines the unique identifier(s) based on user-generated data or postings extracted from the social media websites. The user-generated data may include images, postings, text, numbers, symbols, and so forth.

The identifier customizing device 216 may be configured to present a menu or an identifier customizing menu including one or more options for customizing the at least one unique identifier. The menu may be presented on a display such as a display of the first computing device 104. In some embodiments, the display may be a projector screen, a television screen, and so forth. The user 102 can select at least one option from the displayed one or more options. The menu options may allow the user 102 to customize the unique identifier by selecting the at least one option. The identifier customizing device 216 may also be configured to customize the at least one unique identifier based on a selection of at least one of the options by the user 102. The identifier customizing device 216 may also be configured to associate the extracted data or the customized unique identifiers with the at least one social media website 106A-106N by prefixing at least one handler to the extracted data.

The data publishing device 208 may be configured to publish or post the user-generated data along with the extracted data through one or more of the social media websites 106A-106N based on a publishing setting defined by the user 102. The publishing setting may include or indicate user preferences regarding the social media websites 106A-106N, regarding the first computing device 104 and the second computing devices 110A-110N, where the user 102 may want the user-generated data, tags, and extracted data to be published. The data publishing device 208 may also be configured to publish the extracted data along with the user-generated data on the one or more social media websites 106A-106N being accessed on one or more computing devices within the network 108.

The first computing device 104 may also include the information stamping device 214 configured to attach location information, in form of a geo tag, to the user-generated data based on a geographical location of the first computing device 104. The geo tag may help the viewers of the content posted on social media to understand the location from where the content was posted. The information stamping device 214 may also be configured to attach time related information to the user-generated data and the device identifier while publishing through the social media websites 106A-106N based on a time setting of the first computing device 104. The time information may include the time when the user-generated data is posted on the social media website 106.

The transceiving device 210 may be configured to send and receive data to and from other computing devices, such as the second computing devices 110A-110N, the server device, and so forth, present in the network 108. The storage device 212 may store the data such as user information, authentication information, menus, and device identifiers of the computing devices, the postings, and so forth.

In some embodiments, the tagging device 206 may be configured to determine at least one unique identifier, such as an identifier, based on the data extracted from the device identifier. The unique identifier may include at least one keyword including text, symbols, numbers, and so forth. Further, the unique identifier may uniquely identify the data in the network 108. The tagging device 206 may also be configured to associate the time information based on a time setting of the computing device, such as the first computing device 104, with the user-generated data. Further, the tagging device 206 is also configured to attach geographical location of a computing device, for example the first computing device 10, with the user-generated data.

In some embodiments, the user 102 may manually select an identifier or tag including text, symbols, numbers, etc., based on the user-generated data. The tagging device 206 may also be configured to associate the identifier or tag with the user-generated data for uniquely identifying the user-generated data. In some embodiments, the tagging device 206 associates the unique identifier or tag with the user-generated data using the OCR or the OPR technique.

Further, in some embodiments, the transceiving device 210 may broadcast the unique identifiers and the broadcasted information may be detected by detection device of the second computing devices 110A-110N, and vice versa. Each published posting of the social media websites 106A-106N may include a hash symbol i.e. "#", an "@" symbol, and a canned text. The canned text may be a drop down list including the probable unique identifiers based on the extracted data or user-generated data. Further, the menu may allow the user 102 to select or customize different unique identifiers for different social media websites 106A-106N. This way the disclosed system on the first computing device 104 may streamline the operation of tagging the content on various social media websites with unique identifiers and eliminates mis-firing that may happen sure to typing errors, and omissions.

Figure 3A:
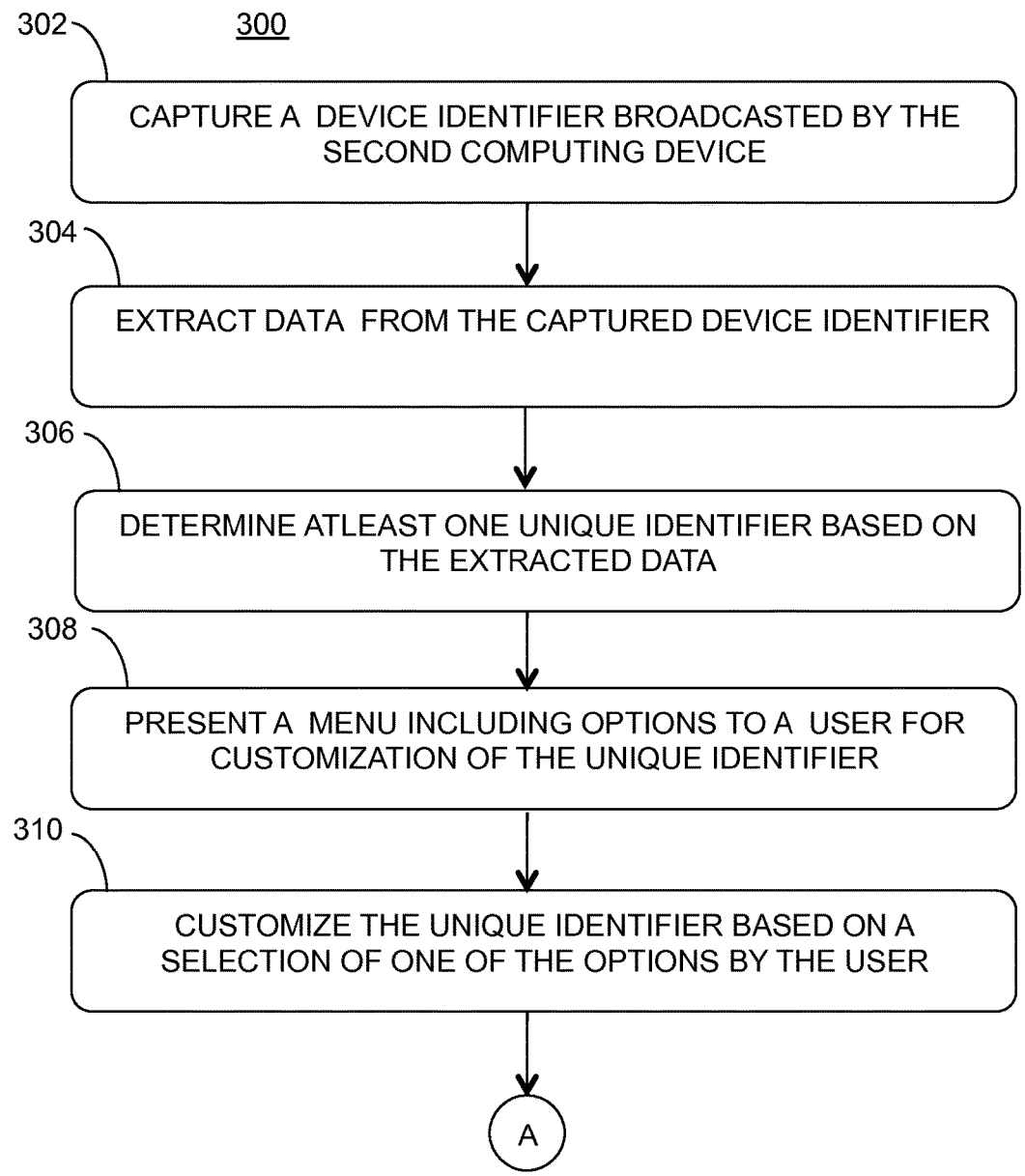
FIG. 3A-3B is a flowchart illustrating an exemplary method for customizing unique identifiers and publishing data through one or more social media websites, in accordance with an embodiment of the present disclosure.
Figure 3B:
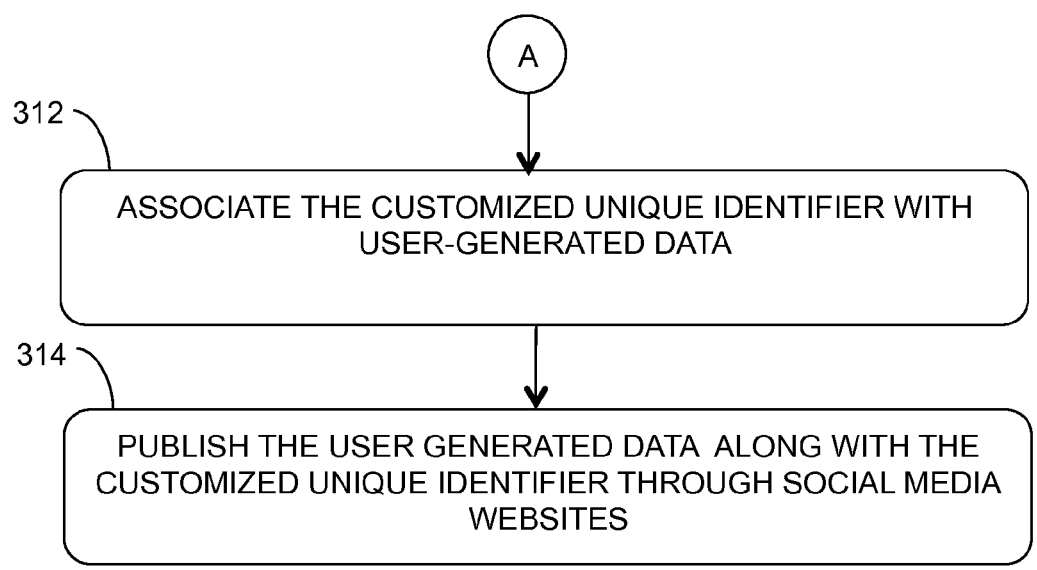

FIG. 3A-3B is a flowchart illustrating an exemplary method 300 for customizing unique identifier(s) and publishing data through social media websites 106A-106N, in accordance with an embodiment of the present disclosure. As discussed with reference to FIG. 1, the user 102 may access the social media website 106A on the first computing device 104 for publishing and/or tagging data, images, postings etc.. Further, as discussed with reference to FIG. 1, the user 102 may publish and tag the images, postings etc. through the server device. Further, as discussed with reference to FIG. 2, the first computing device 104 includes the detection device 202, the identifier processing device 204, the tagging device 206, the data publishing device 208, the transceiving device 210, the storage device 212, the information stamping device 214, and the identifier customizing device 216.

The second computing device 110A is configured to broadcast the device identifier. At step 302, a device identifier of a second computing device, such as the second computing device 110A, is captured. The second computing device 110A is configured to broadcast the device identifier. The device identifier may include a Service Set Identifier (SSID) and a Universal Unique Identifier (UUID), and so forth. At step 304, data is extracted from the captured device identifier. In some embodiments, the identifier processing device 204 captures the device identifier and extracts data from the device identifier.

At step 306, the tagging device 206, based on the extracted data, determines at least one unique identifier or tag. At step 308, a menu including one or more options for customization of the at least one unique identifier is presented to the user 102. The menu may be present by the identifier customizing device 216 on a display of the first computing device 104. The user 102 can select one or more options from the displayed options of the menu for customizing the unique identifier. An exemplary menu is shown in FIG. 5 and will be described in detail in FIG. 5.

Then at step 310, the at least one unique identifier is customized based on a selection of one of the options received from the user 102. The identifier customizing device 216 may customize the unique identifier based on the received selection of the option. At step 312, the customized unique identifier is associated with a user-generated data. The user-generated data may include images, text, numbers, symbols, postings, and so forth. In some embodiments, the identifier customizing device 216 associates the customized unique identifier(s) with the user-generated data. In further embodiments, the identifier customizing device 216 associates the customized unique identifier(s) with the user-generated data by prefixing at least one handler to the extracted data. Examples of the handlers may include, but are not limited to, "#Hashtag", "@MyHandle", "Owner@email.com", "http://domain.com/sub", "Quick Response (QR) code", and so forth.

At step 314, the user-generated data along with the customized unique identifier(s) are published through one or more of the social media websites 106A-106N. In some embodiments, the information such as time related, location related is also published along with the user-generated data through the social media websites 106A-106N. In some embodiments, the data publishing device 208 publishes the user-generated data, the customized unique identifier etc. through the social media websites 106A-106N. The information stamping device 214 may attach the geo-location information and the time related information on the user-generated data based on the geographical location of the first computing device 104 and a timestamp based on the clock settings of the first computing device 104, may be added to the user-generated data being posted on social media websites 106A-106N.

Figure 4:
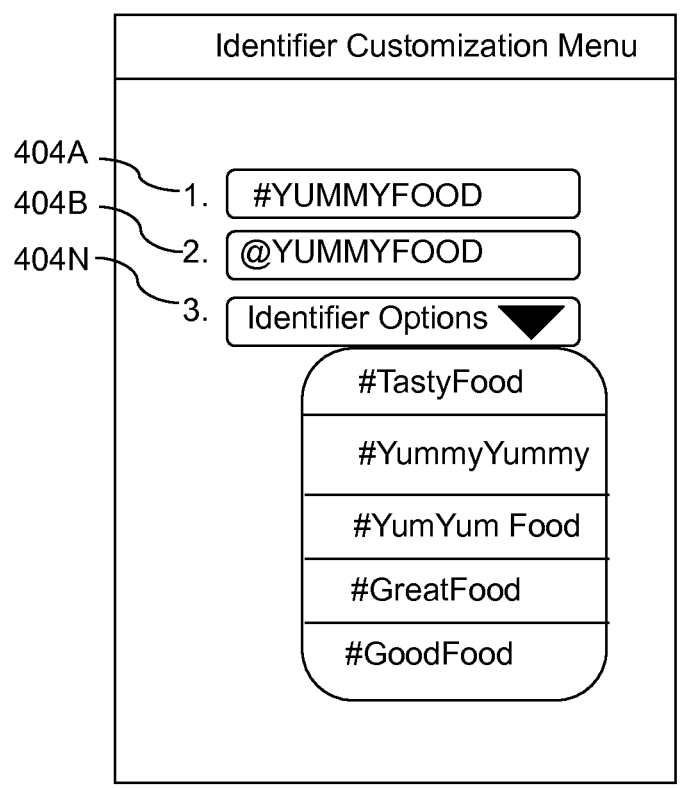
FIG. 4 shows an exemplary identifier customization menu, in accordance with an embodiment of the present disclosure.

FIG. 4 is an exemplary menu 402 that may be presented to the user 102 for allowing the user 102 to customize unique identifiers. In an illustrative embodiment, the user 102 is provided an option of attaching unique strings for potential unique identifiers that may be posted as content on social media platforms or websites 106A-106N. In the example provided a user or the user 102 visits a restaurant called "Yummy Land" in New York and wants to post a photograph of the food on a social media website such as Facebook™. When the user 102 is posting the photograph on Facebook, the user 102 is provided with an identifier customization menu 402 including probable list of options 404A-404N for customization of tags or identifiers that may be used along with the photograph. In an embodiment, this list of options 404A-404N may be broadcasted as unique strings by the wireless access device present in the restaurant and since the user's device (for example, a smart phone) is within the vicinity of the wireless access device, the user device is able to capture the unique strings (suggested options 404A-404N in this case). The user 102 may choose any of the options 404A-404N that the user 102 may like and post the content on the Facebook™. In an alternate embodiment, instead of the options 404A-404N, phrases, taglines or email ids may be recommended to the user 102 for inclusion along with the photograph. The user 102 may be presented with menu including options 504A-504N i.e. "#YUMMYFOOD", "@YUMMYFOOD", "!YUMMYFOOD" or canned texts may be provided as a drop down menu as shown by 404N. In the drop down menu 404N, various text options may be provided to the user 102 for selection. The user 102 can select at least one of these options 404A-404N for customizing the identifier.

Though not shown, but the customization of the unique identifier may happen with respect to initial character or symbol, last symbol, middle character, and so forth. Also the user 102 may manually add character, text, symbol, numbers, in the unique identifier while customizing the unique identifier.

A system used for the purpose of posting social media content in accordance with the method provided herein may include a wireless access device or a computing device that may be configured to store an identifier with a unique string. In an embodiments, this identifier containing the unique string is transmitted/broadcasted with the help of a wireless transmitter coupled with the wireless access device. Once a receiver, which may be a computing device used by a user, is brought within the vicinity of the wireless access device, the receiver may capture the unique sting being broadcasted with the identifier. In one embodiment, the processing unit of the system may then be used to attach the unique string to user-generated content. The computing unit of the system may be configured to automatically post the content on social media platforms. In an alternate embodiment the system may be configured to include geo tag and timestamp to the user content being posted on social media.

A computer program product including program instructions tangibly stored on a computer-readable medium and operable to cause a computer system to perform the method disclosed herein may be an application software that enables a computing device to capture unique strings included within identifiers being broadcasted by a wireless access device. The unique identifier may be an SSID. The application program may further provide an interface that permits the user to choose and attach specific unique strings to the content being posted on social media. In an alternate embodiment the application software may be configured to automatically post content on pre designated social media platforms along with the chosen unique strings attached to such content.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another devices, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A system for publishing data on at least one social media website, the system comprising:
   an identifier processing device configured to:
      determine a device identifier (ID) of a computing device publishing the at least one social media website, wherein the device identifier uniquely identifies the computing device in a network; and
      extract data from the determined device identifier of the computing device;
   a tagging device configured to determine at least one unique identifier based on the extracted data;
   an identifier customizing device configured to:
      present a menu to a user, wherein the menu including one or more options for customizing the at least one unique identifier;

customizing the at least one unique identifier based on a selection of at least one of the options received from the user; and associating the customized at least one unique identifier with user-generated data; and a data publishing device configured to publish the customized at least one unique identifier along with the user-generated data through the at least one social media website on the computing device.

2. The system of claim 1, wherein the network is a wireless network.

3. The system of claim 1, wherein the device identifier comprises at least one of a Service Set Identifier (SSID) and a Universal Unique Identifier (UUID).

4. The system of claim 1, wherein the tagging device is also configured to determine the at least one unique identifier by prefixing at least one handler to the extracted data.

5. The system of claim 1, wherein the data publishing device is also configured to publish the customized at least one unique identifier along with the user-generated data on the one or more social media websites being accessed on one or more computing devices within the network.

6. The system of claim 1 further comprising information stamping device configured to:

attaching location information to the user-generated data based on a geographical location of the computing device; and attaching time information to the user-generated data and the device identifier while publishing through the at least one social media website based on a time setting of the computing device.

7. A method for publishing data on at least one social media website, the method comprising:

determining, by an identifier processing device, a device identifier (ID) of a computing device publishing the at least one social media website, wherein the device identifier uniquely identifies the computing device in a network;

extracting, by the identifier processing device, data from the determined device identifier of the computing device;

determining, by a tagging device, at least one unique identifier based on the extracted data;

presenting, by an identifier customizing device, a menu to a user, wherein the menu including one or more options for customizing the at least one unique identifier;

customizing, by the identifier customizing device, the at least one unique identifier based on a selection of at least one of options received from the user;

associating, by the identifier customizing device, the customized at least one unique identifier with a user-generated data;

publishing, by a data publishing device, the customized at least one unique identifier along with the user-generated data through the at least one social media website.

8. The method of claim 7, wherein the device identifier comprises at least one of a Service Set Identifier (SSID) and a Universal Unique Identifier (UUID).

9. The method of claim 7 further comprising determining, by the tagging device, the at least one unique identifier by prefixing at least one handler to the extracted data.

10. The method of claim 7 further comprising publishing, by the data publishing device, the customized unique identifier along with the user-generated data on the one or more social media websites being accessed on one or more computing devices within the network.

11. The method of claim 7 further comprising:

attaching, by an information stamping device, location information to the user-generated data based on a geographical location of the computing device; and attaching, by an information stamping device, time information to the user-generated data and the device identifier while publishing on the at least one social media website based on a time setting of the computing device.

12. A method for publishing data through at least one social media website using a first computing device, the method comprising:

detecting, by a detection device, a second computing device present within a pre-defined area from the first computing device;

capturing, by an identifier processing device, a device identifier of the second computing device during broadcast of the device identifier by the second computing device, wherein the device identifier uniquely identifies the second computing device in a network;

determining, by a tagging device, at least one unique identifier based on the captured device identifier;

presenting, by an identifier customizing device, a menu including one or more options for customizing the at least one unique identifier to a user;

customizing, by the identifier customizing device, the at least one unique identifier based on a selection of at least one of options by the user;

associating, by the identifier customizing device, the customized at least one unique identifier with a user-generated data;

publishing, by a data publishing device, the user-generated data along with the customized unique identifier through the at least one social media website.

13. A system for publishing data on at least one social media website using a first computing device, the system comprising:

a detection device configured to detect a second computing device present within a pre-defined area from the first computing device;

an identifier processing device configured to capture a device identifier of the second computing device during broadcast of the device identifier by the second computing device, wherein the device identifier uniquely identifies the second computing device in a network;

a tagging device configured to determine at least one unique identifier based on the extracted data of the device identifier;

an identifier customizing device configured to:

present a menu including one or more options for customizing the at least one unique identifier to a user;

customizing the at least one unique identifier based on a selection of at least one of the options received from the user; and associating the customized at least one unique identifier with user-generated data; and a data publishing device configured to publish the user-generated data along with the customized at least one unique identifier through the at least one social media website.

* * * * *